United States Patent Office 3,436,098
Patented Apr. 1, 1969

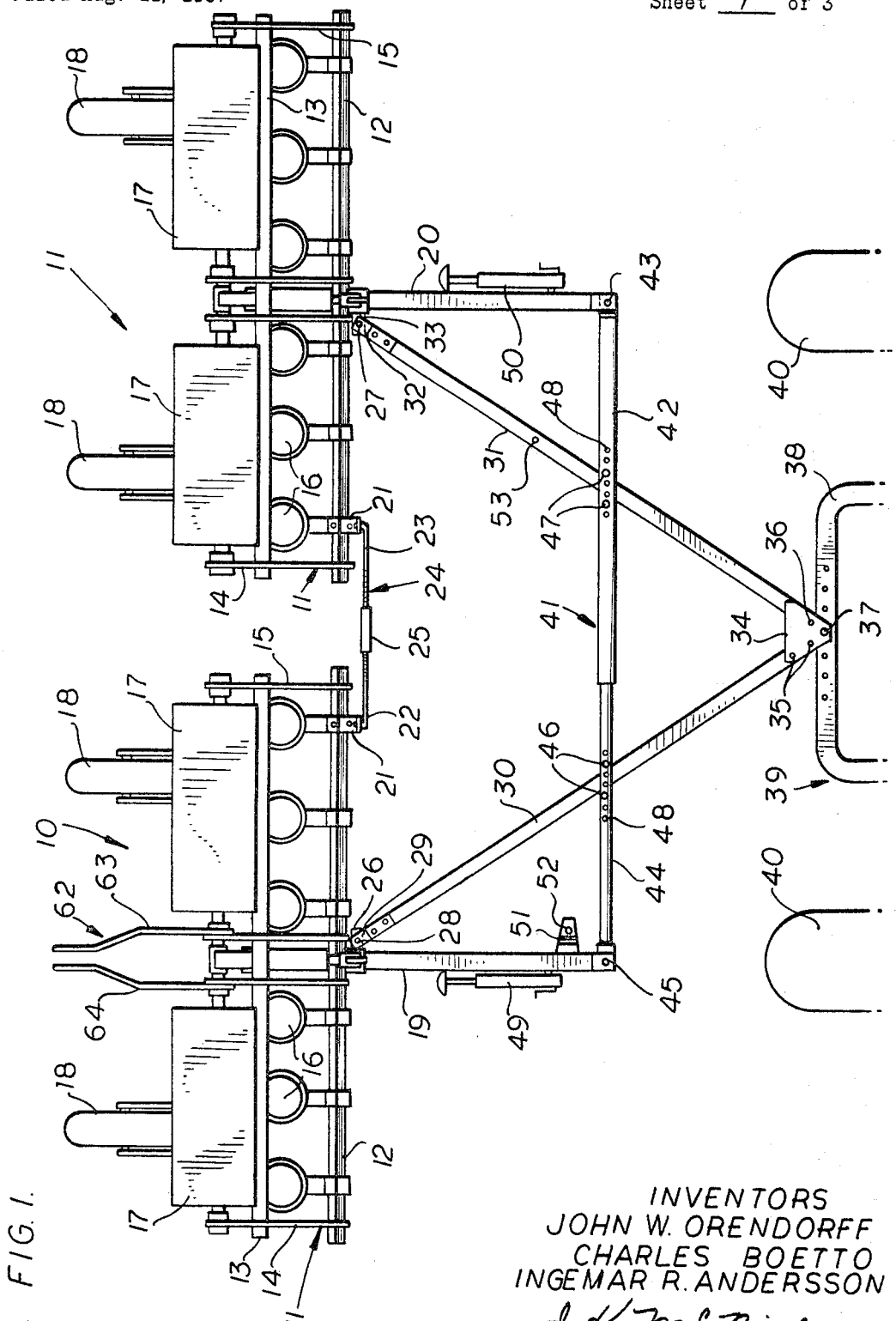

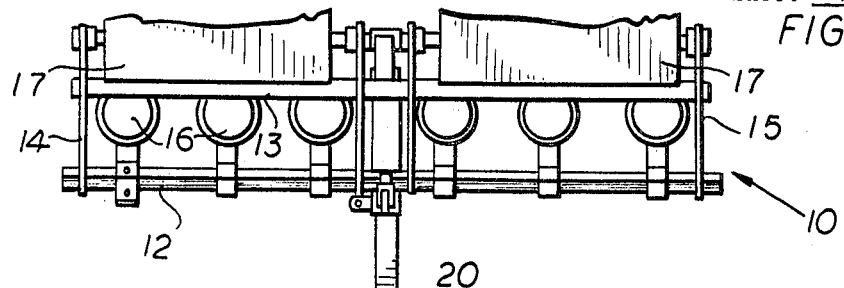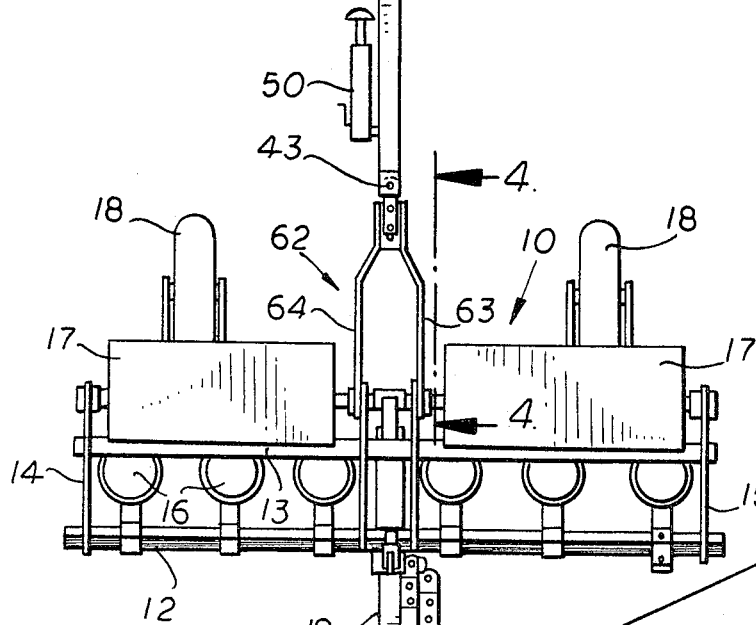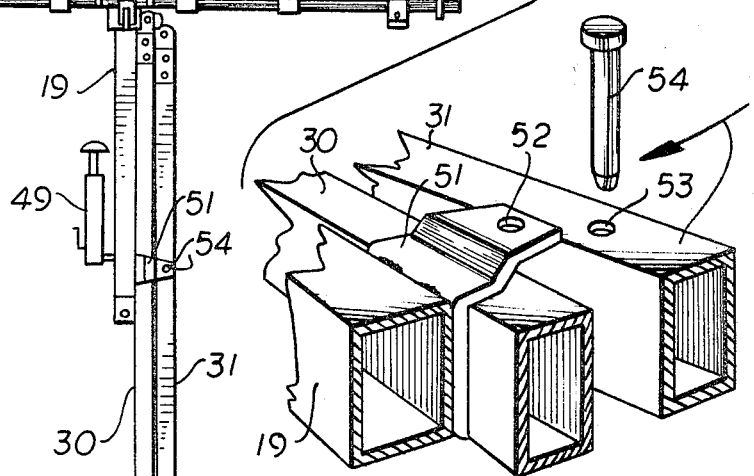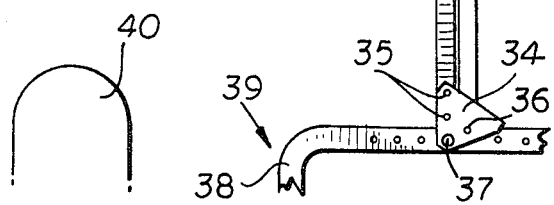

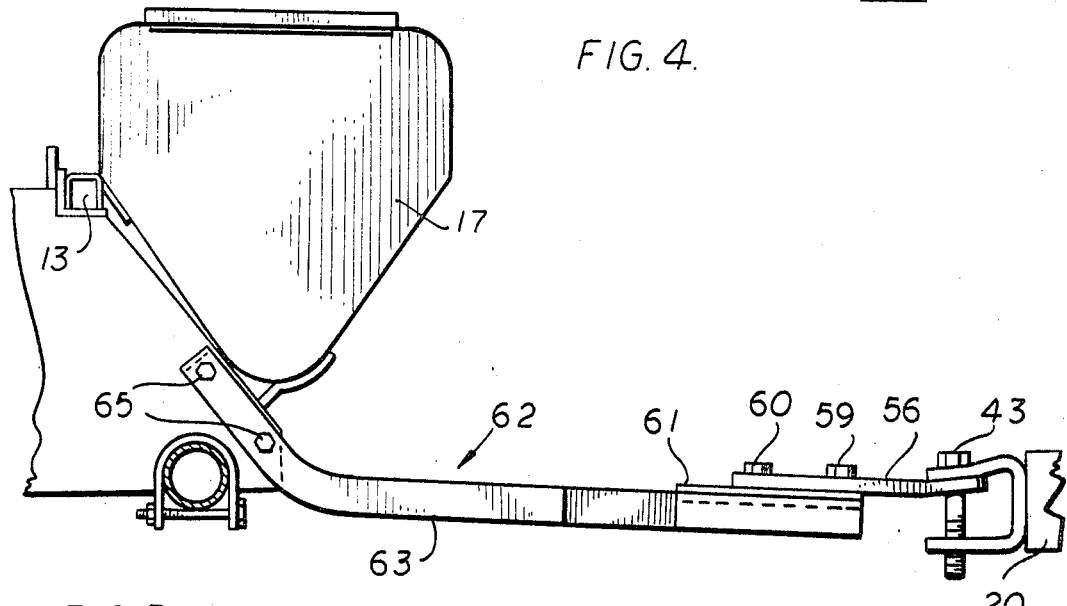
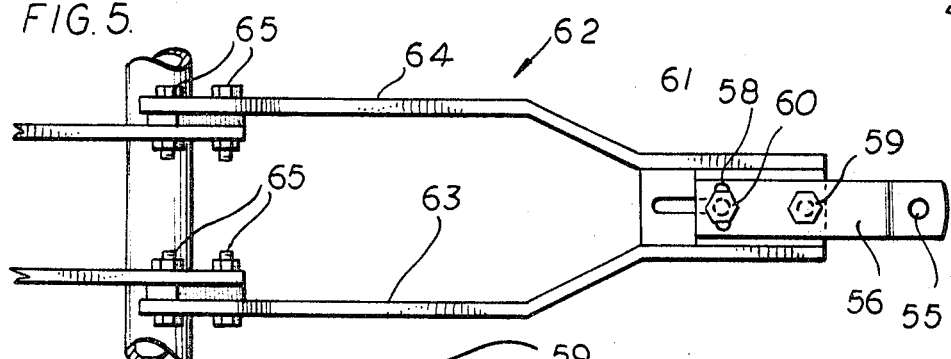
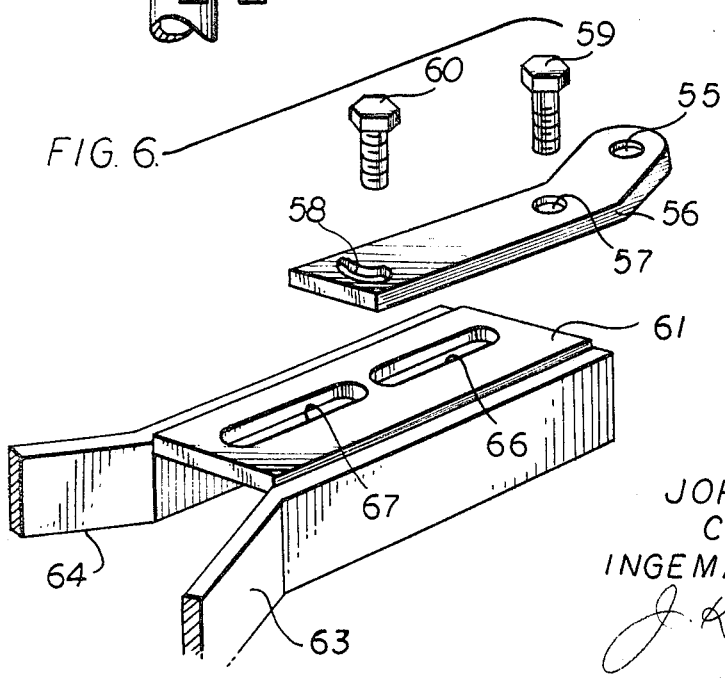

3,436,098
FLEXIBLE DUPLEX HITCH
John W. Orendorff, Downers Grove, Charles Boetto, Naperville, and Ingemar R. Andersson, Westmont, Ill., assignors to International Harvester Company, Chicago, Ill., a corporation of Delaware
Filed Aug. 11, 1967, Ser. No. 659,911
Int. Cl. B60d 1/02
U.S. Cl. 280—412         5 Claims

ABSTRACT OF THE DISCLOSURE

A duplex hitch for a pair of transversely aligned implements permitting vertical flexibility of the implement units and in which the units have their inner ends connected for independent vertical movement and the spacing is maintained between the ends of the draft tongues by a cross brace also secured to forward converging hitch bars for connection of the implement units to a common point on the tractor, the rear ends of the hitch bars being pivotally connected to the implement units adjacent the center lines thereof, the cross brace and one of the hitch bars being disconnectable from its implement unit and foldable with the other hitch bar to a parallel position alongside the hitch bar of the other unit to serve as the draft means for both units arranged in tandem.

---

This invention relates to agricultural implements and particularly to a duplex hitch for multiple implements such as harrows, planters and the like. More specifically, the invention concerns a duplex hitch which is easily converted for transporting the implements in tandem.

Duplex hitches for laterally aligned trailing implements usually fail to provide adequately for the needed flexibility of the aligned units, or to prevent relative vertical movement thereof about vertical axes, or sacrifice the capacity of the implement, either in operation or in transport, to satisfactorily follow the path of the tractor, and an object of this invention is the provision of a duplex implement hitch in which the individual flexibility of the units is retained while maintaining the correct operating attitudes of the unts during operation, without sacrificing the ability of the implement to follow the path of the tractor.

Another object of the invention is the provision of a duplex hitch adapted to connect multiple implement units to a tractor, and collapsible for use in connecting one of the units on the center line of the tractor with the other unit in tandem behind the other.

Other objects and advantages of the invention will become clear from the following detailed description when read in conjunction with the accompanying drawings, wherein:

FIGURE 1 is a plan view of a pair of laterally aligned planters connected in trailing relation to a tractor by duplex hitch means incorporating the features of this invention;

FIGURE 2 is a plan view of the implement units shown in FIGURE 1 in tandem relation for transport;

FIGURE 3 is an enlarged sectional detail in perspective of a portion of the hitch mechanism of this invention;

FIGURE 4 is a section taken on the line 4—4 of FIGURE 2;

FIGURE 5 is a plan view of a portion of the structure shown in FIGURE 4; and

FIGURE 6 is an enlarged exploded view in perspective of a portion of the structure shown in FIGURES 4 and 5.

While the duplex hitch of this invention is shown and described in its application to a multiple unit planter, it should be understood that it is equally applicable to other types of implements. In the drawings the numerals 10 and 11 designate a pair of laterally aligned trailing planters of conventional construction the details of which form no part of this invention. However, it may be understood that each unit comprises a frame 11 including transverse bars 12 and 13 and end plates 14 and 15. Seed and fertilizer to furrows formed by conventional furrow opener units, not shown. The planter units 10 and 11 are supported by ground engaging wheels 18 and are provided with centrally disposed draft bars 19 and 20, respectively, rigidly affixed to and projecting forwardly from frame bars 12.

The planter units are adjustably connected by means accommodating independent vertical floating movement of the units and comprising a pair of brackets 21 affixed to frame bars 12 and to which are pivotally connected the ends of threaded rods 22 and 23 of a turnbuckle 24 having a threaded sleeve 25 in which the ends of rods 22 and 23 are adjustably received to vary the effective length of the turnbuckle and adjust the spacing between the units 10 and 11.

Lugs 26 and 27 are affixed to and project inwardly from the respective draft bars 19 and 20 adjacent frame bar 12. Lug 26 is loosely connected by a pivot pin 28 for vertical and horizontal pivotal movement to a clevis 29 secured to one end of a hitch bar 30 directed diagonally forwardly in converging relation to another hitch bar 31, the rear end of which is provided with a clevis 32 which is loosely connected by a pivot pin 33 with lug 27.

A triangularly shaped plate 34 is secured by bolts 35 to the forward end of hitch bar 30 and is connected by a pivot pin 36 to the forward end of hitch bar 31. Plate 34 is connected by a pin 37 to the drawbar 38 of a tractor 39 having laterally spaced rear drive wheels 40.

In order to stabilize hitch bars 30 and 31 and draft bars 19 and 20 and to maintain the spacing between the latter and prevent relative horizontal movement of units 10 and 11, a cross brace is provided in the form of a bar 41 comprising a sleeve portion 42 loosely connected by a pivot pin 43 to the forward end of draft bar 20, and a shaft 44 slidably received in sleeve 41 and loosely connected by a pivot pin 45 with the forward end of draft bar 19.

Cross bar 41 is affixed to hitch bars 30 and 31 medially of their ends by suitable pin or bolt means such as a U-bolt surrounding hitch bar 30 and having its threaded ends extending upwardly through apertures in shaft 44 and secured by nuts 46. A similar U-bolt confining hitch bar 31 extends upwardly through apertures in sleeve 42 and is fastened by nuts 47.

Adjustment of the spacing between units 10 and 11 is accomplished by adjusting the effective length of turnbuckle 24, other apertures 48 being provided in crossbar 41 to adjust the effective length of crossbar 41 to compensate for the change in length of turnbuckle 24.

To convert the duplex hitch structure of this invention to transport use, a pair of implement stands 49 and 50 of a well-known type are swung downwardly to support the draft bars 19 and 20. Turnbuckle 24 and crossbar 41 are removed and hitch bar 31 is released from its connection to implement unit 11 by removing pin 33. Hitch bar 31 is then horizontally swingable about pin 31 to a folded or collapsed position alongside hitch bar 30, and both bars are swingable to the position shown in FIGURE 2 parallel to hitch bar 19, after removal of hitch pin 37 from the tractor drawbar.

The hitch bars 30 and 31 are locked to draft bar 19 by the provision of a laterally extending clamping member 51 adapted to extend over hitch bar 30 and provided with an aperture 52 registrable with an opening 53 in hitch bar 31 to receive a locking pin 54.

The tractor is driven to a position with its center in alignment with hitch plate 34 for reconnection to drawbar 38 with pin 37. Implement stand 49 is swung upwardly to its inoperative position and unit 10 is moved to the tandem position of FIGURE 2 where pin or bolt 43 carried by draft bar 20 is inserted in an opening 55 in a bar 56 having an opening 57 and a slot 58 therein to receive, respectively, bolts 59 and 60 for adjustable connection of the bar 56 to a plate 61 affixed to the rear end of a yoke 62. Yoke 62 comprises laterally spaced arms 63 and 64 secured by bolts 65 to planter unit 10.

In addition to the lateral adjustment provided by bolt 60 in slot 58, longitudinal adjustment of the hitch point of draft bar 20 of unit 11 is accomplished by providing longitudinally extending slots 66 and 67 in plate 61 to receive bolts 59 and 60. Suitable nuts, not shown, are provided for securing plate 56 to yoke 62 in the adjusted position thereof.

Implement stand 50 is again returned to its inoperative position as shown in FIGURE 2 and the implement is ready for transport.

It is believed that the construction and operation of the duplex hitch of this invention will be clearly understood from the foregoing description. It should likewise be understood that the invention has been described in its preferred embodiment and that modifications may be made therein without departing from the spirit of the invention.

What is claimed is:

1. For use in an implement including laterally aligned units, each having a pair of laterally spaced supporting wheels and a rigid forwardly projecting draft bar and disconnectably connected at their inner ends by means accommodating independent vertical floating movement of said units: duplex hitch means for connecting said units to a tractor comprising, a pair of forwardly converging hitch bars pivotally connected at their rear ends to the respective of said units adjacent said draft bars for vertical and horizontal movement relative thereto and pivotally connected at their forward ends at a common attaching point on the tractor, and a rigid cross bar removably secured to said hitch bars medially of their ends and disconnectably connected at its ends to said draft bars, one of said hitch bars being disconnectable from one of said units and swingable with the other of said draft bars, upon removal of said cross bar, to a collapsed position alongside the draft bar of the other of said units.

2. The invention set forth in claim 1, wherein means are provided on said other of said units for connecting the draft bar of said one of said units to said other of said units for transport in tandem.

3. The invention set forth in claim 2, wherein means are provided on the draft bar of the other of said units for locking said hitch bars thereto.

4. The invention set forth in claim 3, wherein means are provided on the draft bars of at least one of said units adapted to provide ground support therefor when said one of said hitch bars and said cross bar are disconnected therefrom.

5. The invention set forth in claim 1, wherein said means connecting the inner ends of said units is adjustable in length to vary the spacing therebetween and said cross bar is adjustable in length to compensate for the adjustment of said connecting means.

References Cited

UNITED STATES PATENTS

| | | | |
|---|---|---|---|
| 2,357,761 | 9/1944 | Peacock | 280—412 |
| 3,064,996 | 11/1962 | Poppel | 280—412 |
| 3,135,337 | 6/1964 | Morris | 280—412 X |
| 3,387,861 | 11/1968 | Bauman | 280—412 |

LEO FRIAGLIA, *Primary Examiner.*